Patented Nov. 8, 1938

2,136,347

UNITED STATES PATENT OFFICE 2,136,347

STABILIZING VINYLIDENE CHLORIDE

Ralph M. Wiley, Midland, Mich., assignor to The Dow Chemical Company, Midland, Mich., a corporation of Michigan No Drawing. Application July 2, 1937, Serial No. 151,721

2 Claims. (Cl. 23—250)

This invention relates to the art of stabilizing vinylidene chloride, $H_2C=CCl_2$, and to improved compositions thereby obtained.

When vinylidene chloride is exposed to the action of air, light, elevated temperatures, or to any of several catalytic agents, it polymerizes readily forming resinous products, the properties of which will depend to a great extent upon the conditions of polymerization. This tendency to polymerize is so persistent that it has become necessary to provide a means by which vinylidene chloride may be maintained in the monomeric form at least temporarily, so that it can be stored for a period of time following its preparation and prior to its use in chemical reactions or in resin formation. It is accordingly among the objects of the present invention to provide a means whereby vinylidene chloride may be inhibited against polymerization. A further object is to provide a relatively stable monomeric vinylidene chloride. Another object is to provide a stabilized vinylidene chloride composition from which the stabilizing agent can be readily removed when desired.

I have discovered that vinylidene chloride can be inhibited against polymerization by adding thereto relatively small quantities of certain inorganic compounds, or a combination thereof, and further that the stabilizing agents can again be readily separated from the vinylidene chloride to render the same capable of polymerization. Among the various inorganic materials which I have found to be effective are strong mineral acids, such as concentrated sulphuric and nitric acids, iodine, and inorganic chlorides which liberate hydrogen chloride on reaction with water, such as chlorosulphonic acid, thionyl chloride, sulphur chloride, the antimony chlorides, arsenic chlorides, platinum chloride, and titanium chloride. With the exception of sulphuric and nitric acids the aforementioned compounds are all readily miscible with or soluble in vinylidene chloride.

The concentration of stabilizing agents to be employed in monomeric vinylidene chloride may be varied depending upon the length of time which it is desired to stabilize the compound, upon the effectiveness of the particular agent employed, and upon whether any polymerization catalysts have previously been added to the vinylidene chloride. For most purposes a freshly distilled vinylidene chloride will be found to remain in monomeric form if there is added thereto from about 0.2 to about 2.0 per cent of one of the aforementioned stabilizing agents. In no case has it been found necessary to employ greater amounts of inhibitor than about 10 per cent of the weight of vinylidene chloride.

In a preferred method of carrying out my invention, a small amount of one of the stabilizing or inhibiting agents previously mentioned, suitably about 0.5 per cent based on the weight of vinylidene chloride, is added to freshly distilled monomeric vinylidene chloride, which may then be stored. When it is desired to utilize the stabilized vinylidene chloride in polymerization processes, the stabilizing agents may be readily and completely removed from the solution by shaking the mixture with dilute aqueous alkali. Another means of separating the inhibitor from the vinylidene chloride consists in distilling the latter material from the less volatile inhibitor. Owing to the volatility of some of the inhibiting or stabilizing agents mentioned above, this process is not quite as satisfactory as the alkaline extraction method. After the vinylidene chloride has been separated from the stabilizer it is found to polymerize readily when exposed to usual polymerizing conditions.

The following example serves to illustrate the practice of my invention:

Example

Freshly distilled vinylidene chloride was exposed to the air for 72 hours at room temperature and was filtered to remove the small amount of polymeric material which had formed. The filtrate was a clear solution having a strongly acid odor. Two 32-gram portions of the liquid were placed in small glass bottles to one of which was added 0.16 grams of iodine. Both bottles were tightly stoppered and placed in a constant temperature bath at 55° C. At the end of 44 hours no polymer had formed in the sample containing iodine while the other bottle contained a solid polymer weighing 26.2 grams, which indicates that 82 per cent of the vinylidene chloride therein had polymerized.

Other modes of applying the principle of my invention may be employed instead of those explained, change being made as regards the materials employed, provided the steps or materials stated in the following claims be thereby carried out or obtained.

I therefore particularly point out and distinctly claim as my invention:—

1. A composition of matter comprising monomeric vinylidene chlodide and sufficient iodine to impart stability.

2. A composition of matter comprising monomeric vinylidene chloride and between about 0.2 and about 2.0 per cent iodine.

RALPH M. WILEY.